(12) United States Patent
Cheong

(10) Patent No.: US 7,688,885 B1
(45) Date of Patent: Mar. 30, 2010

(54) EFFICIENT BLIND EQUALIZATION FOR QUADRATURE AMPLITUDE MODULATION

(75) Inventor: Kok-Wui Cheong, San Jose, CA (US)

(73) Assignee: Marvell International Ltd., Hamilton (BM)

(*) Notice: Subject to any disclaimer, the term of this patent is extended or adjusted under 35 U.S.C. 154(b) by 789 days.

(21) Appl. No.: 11/491,327

(22) Filed: Jul. 21, 2006

Related U.S. Application Data

(60) Provisional application No. 60/734,581, filed on Nov. 8, 2005.

(51) Int. Cl.
*H03H 7/30* (2006.01)
(52) U.S. Cl. .................. 375/229; 375/235
(58) Field of Classification Search ......... 375/232–234, 375/326, 350
See application file for complete search history.

(56) References Cited

U.S. PATENT DOCUMENTS 6,011,814 A * 1/2000 Martinez et al. ............ 375/233
6,842,495 B1 * 1/2005 Jaffe et al. .................. 375/326
7,006,565 B1    2/2006 Endres et al.
2009/0059960 A1 * 3/2009 Li ............................. 370/498

OTHER PUBLICATIONS

Godard, Dominique N., "Self-Recovering Equalization and Carrier Tracking in Two-Dimensional Data Communication Systems," IEEE Transactions on Communications, vol. Com-28, No. 11, Nov. 1980.
Al-Dhahir, Naofal et al., "Efficient Computation of the Delay-Optimized Finite-Length MMSE-DFE," *IEEE Transactions on Signal Processing*, vol. 44, No. 5, May 1996, pp. 1288-1292.

* cited by examiner

Primary Examiner—Emmanuel Bayard

(57) ABSTRACT

Methods and apparatus are provided for receiving a signal transmitted with a quadrature amplitude modulation (QAM) constellation. In an embodiment of the invention, a blind equalization algorithm can be performed to equalize the signal, and a constellation recovery algorithm can be performed to identify a constellation index corresponding to the QAM constellation. The blind equalization algorithm can be altered based on the identified constellation index. The invention advantageously allows for relatively efficient and relatively reliable equalization of signals transmitted with an unknown QAM constellation.

28 Claims, 16 Drawing Sheets

FIG. 2

16-QAM

```
              214
          •   •  |  •   •
         1011 1010 0010 0011
          I,Q=10  |  I,Q=00
     216  •   •  |  •   •
          1001 1000 0000 0001
        ─────────┼───────── 212
     218  •   •  |  •   •
         1101 1100 0100 0101
          I,Q=11  |  I,Q=01      202
     220  •   •  |  •   •
         1111 1110 0110 0111
```

32-QAM

```
                    214
              •   •  |  •   •
            10010 10110 00110 00010
       •    •   •   | •    •    •
     10111 10101 10100 00100 00101 00111
             I,Q=10   |   I,Q=00
       •    •   •   | •    •    •
     10011 10001 10000 00000 00001 00011
        ─────────────┼───────────── 212
       •    •   •   | •    •    •
  216 11011 11001 11000 01000 01001 01011
             I,Q=11   |   I,Q=01
       •    •   •   | •    •    •
  218 11111 11101 11100 01100 01101 01111
              •   •  |  •   •                  204
  222       11010 11110 01110 01010
```

64-QAM

```
                                          220
         214  •      •      •      •
              001000 001001 001101 001100
              •      •      •      •        216
              001010 001011 001111 001110
                      I,Q=00
              •      •      •      •
              000010 000011 000111 000110  218
      π/2 rotation
      I,Q=10   •      •      •      •
              000000 000001 000101 000100
                                            212
      I,Q=11  | I,Q=01                      206
      π rotation | 3π/2 rotation
```

EFFICIENT BLIND EQUALIZATION FOR QUADRATURE AMPLITUDE MODULATION

CROSS-REFERENCE TO RELATED APPLICATION

This application claims the benefit of provisional application No. 60/734,581, filed Nov. 8, 2005, which is hereby incorporated by reference herein in its entirety.

BACKGROUND OF THE INVENTION

This application relates to digital communication. More particularly, this application relates to blind equalization of quadrature amplitude modulated signals with an unknown constellation.

Communication involves a transmitter encoding a message in a signal which is sent across a channel to a receiver. Depending on the channel characteristics, the signal may be corrupted when traveling through the channel. A key challenge in communication theory is how to overcome this corruption, to reliably and efficiently extract the message from a received signal. An equalizer is a device designed to compensate for signal corruption by tuning a set of filter values used to filter the received signal. In some applications, the equalizer tunes its filter values using a training signal (e.g., a signal sent before the message signal and whose uncorrupted version is known by the equalizer). In applications where the transmitter does not send a training signal, the equalization is referred to as "blind equalization."

The process by which the equalizer tunes its filter values may depend on how the transmitter modulates an electronic signal to encode the information in the message. Electronic signals used in communication are generally characterized by at least three well-known properties—frequency, amplitude, and phase—any one of which can be used to represent information. For example, AM radio stations use electromagnetic signals that contain information in their amplitudes, and FM radio stations use electromagnetic signals that contain information in their frequencies. In general, the process of producing a signal that contains information in its frequency, amplitude, and/or phase is called modulation, and the counterpart process of retrieving information from such a signal is called demodulation or detection. For example, for a radio station, AM stands for amplitude modulation and FM stands for frequency modulation.

AM and FM communication protocols are mainly used in radios that communicate analog audio information, other communication protocols are generally used to communicate digital information. One popular digital communication protocol is known as quadrature amplitude modulation (QAM), in which the communication signal is a combination of two amplitude-modulated sinusoidal signals that have the same frequency but that are $\pi/2$ radians apart in phase, i.e., "in quadrature." Another name for QAM is I/Q modulation, where the "I" refers to the sinusoidal signal "in phase" and the "Q" refers to the sinusoidal signal "in quadrature" with respect to the in-phase signal.

Electronic signals in communication, including QAM signals, can be represented as complex functions, i.e., functions that have both a real and an imaginary part. Complex functions can be plotted on a complex plane in which the horizontal axis represents the real part of the function and the vertical axis represents the complex part of the function. The use of complex functions is a conceptual tool that provides a convenient way to represent signal amplitude and phase. For example, suppose a signal is characterized by the complex function $s(t)=r(t)+j\cdot m(t)$, where $r(t)$ and $m(t)$ are real-valued functions and j designates the imaginary part of the complex function. Using the complex function, the magnitude of the signal $s(t)$ can be computed by $|s(t)|=\sqrt{(r(t))^2+(m(t))^2}$, and the phase of the signal can be computed by $$\angle s(t) = \arctan\left(\frac{m(t)}{r(t)}\right).$$

As another example, operations that change the frequency content of a signal can also be described using complex numbers and Fourier transforms. For example, one skilled in the art will recognize that multiplying a signal $s(t)$ with the complex sinusoid $e^{j\omega_c t}=\cos(\omega_c t)+j\cdot\sin(\omega_c t)$ in the time domain will produce a resulting signal $s'(t)=s(t)e^{j\omega_c t}$, in which the frequency content of $s'(t)$ is shifted by $\omega_c$ compared to $s(t)$.

In QAM, the two signals transmitted in quadrature may be cosine and sine signals, each having a particular amplitude. The communication signal, which is a combination of these two component signals, may be expressed theoretically as $$s(t)=s_{I,k}\delta(t-kT)\cos(\omega_c t)+s_{Q,k}\delta(t-kT)\sin(\omega_c t),$$

where $\omega_c$ is the angular frequency, $$T = \frac{2\pi}{\omega_c}$$

is the sampling interval, k is an integer sample index, $\delta(t-kT)$ is the time-shifted ideal impulse function, and $s_{I,k}$ and $s_{Q,k}$ are real values representing the amplitudes of, respectively, the cosine and sine signals at sample k.

Each available pair of values $(s_{I,k}, s_{Q,k})$ is called a "signal point," and the set of all available signal points is called a "constellation." Constellations are commonly represented by plotting the available signal points on a two-dimensional graph with the horizontal axis representing possible values of $s_{I,k}$ and the vertical axis representing possible values of $s_{Q,k}$. The number M of signal points in a constellation determines the amount of information that is associated with each signal point. In general, each signal point can represent $b=\lfloor\log_2 M\rfloor$ bits of information, where M is usually a power of two. If the number of bits per signal point is even, for example when M is 16, 64, or 256, transmitters often use "square constellations"—constellations whose signal points form a square when graphed. If the number of bits is odd, for example when M is 32 or 128, transmitters often use "cross constellations"—constellations whose signal points form a cross when graphed, e.g., a square without points at its corners.

Equalization of QAM signals usually requires the receiver to know which specific constellation the transmitter used to modulate the signal. Using this knowledge, the receiver performs an equalization training algorithm, which implements a least mean square (LMS) algorithm, designed to minimize mean squared detection error, to tune the filter values of its equalizer. In particular, the LMS algorithm can be a function of a constant R, whose value varies with the constellation size.

In certain applications, the receiver not only contends with signal corruption, but also does not know which constellation the transmitter used to perform QAM. Instead, the receiver knows only that the constellation is one of a set of different square and cross constellations, and typically equalizes the channel by assuming in turn which constellation is correct and applying the training algorithm with the appropriate R value corresponding to each assumption. When the receiver assumes an incorrect constellation, the set of filter values typically does not converge to a set of values during the training algorithm and the signal-to-noise ration (SNR) remains relatively low. Only when the receiver assumes the correct constellation do the filter values converge during the training algorithm to equalize the channel and yield a relatively high SNR.

Cable television (TV) is an example of an application requiring blind equalization with an unknown constellation. A cable TV box may receive signals from multiple providers, each of whom may use a different constellation to modulate a transmitted signal. Each time a user changes channels when watching cable TV, the receiver may equalize and decode the newly received signal, without a training signal and without knowing the underlying constellation, to create the visual image seen by the user on his TV. Because the equalization process must finish before the user can view the visual image, the amount of time required for equalization can be an important performance metric for any equalizer design.

The current equalization process requires the receiver to perform the training algorithm up to as many times as the number of possible constellations, requiring a relatively significant number of computations. As communication standards evolve, additional constellations may be used, further increasing the number of possible constellations and thus the number of computations necessary to perform blind equalization. A need remains for a more efficient method of performing blind equalization of QAM signals with an unknown constellation.

SUMMARY OF THE INVENTION

In accordance with this invention, methods and apparatus are provided for receiving an input signal transmitted with a QAM constellation. In one aspect of the invention, a blind equalization algorithm can be performed on the input signal. A constellation recovery algorithm can be performed on a signal responsive to the input signal to identify a constellation index corresponding to the QAM constellation. The blind equalization algorithm can be altered based on the identified constellation index.

In another aspect of the invention, circuitry for receiving an input signal transmitted with a QAM constellation can include blind equalization circuitry and constellation recovery circuitry. The blind equalization circuitry can be operable to receive the input signal, while the constellation recovery circuitry can be operable to receive a signal responsive to the input signal and to identify a constellation index corresponding to the QAM constellation. The blind equalization circuitry can include adaptation circuitry operable to alter operation of the blind equalization circuitry based on the constellation index. It will be understood that the term "coupled," as used herein, can define either a direct or an indirect connection between elements.

In another aspect of the invention, receiver circuitry for receiving an input signal transmitted with a QAM constellation can include blind equalization means for performing a blind equalization algorithm on the input signal. The receiver circuitry can also include constellation recovery means for performing a constellation recovery algorithm on a signal responsive to the input signal to identify a constellation index corresponding to the QAM constellation. The receiver circuitry can further include alteration means for altering the blind equalization algorithm based on the identified constellation index. In one embodiment, the constellation recovery means can perform the constellation recovery algorithm in response to substantial stabilization of at least one value of the blind equalization algorithm.

In another embodiment, the receiver circuitry can further include decision-directed equalization means for performing a decision-directed equalization algorithm, which can occur in response to the constellation recovery algorithm identifying a constellation index. The blind equalization means can include filter means for filtering a signal responsive to the input signal using a plurality of filter values to generate a filter output signal. The decision-directed equalization means can include adaptation means for modifying the plurality of filter values based at least in part on the identified constellation index. The constellation recovery means can include gain adjustment means for computing a scaling factor based on the constellation index, as well as scaling means for scaling a signal responsive to the filter output signal by the scaling factor to generate a scaled output signal. The decision-directed equalization means can include decision device means for comparing a signal responsive to the scaled output signal to at least one voltage threshold to generate a decision output signal. The decision-directed equalization means can also include error computation means for computing an error signal based on the scaled output signal and the decision output signal. The adaptation means can modify the plurality of filter values using a signal responsive to the first error signal.

In another embodiment, the blind equalization means can include filter means for filtering a signal responsive to the input signal using a plurality of filter values to generate a filter output signal. The blind equalization means can also include first error computation means for computing a first error signal using a first error function, as well as adaptation means for modifying the plurality of filter values using a signal responsive to the first error signal. The first error function can use a signal responsive to the filter output signal as an input and can remain substantially unchanged until the constellation index is identified. The first error computation means can compute at least one second-order statistic from the signal responsive to the filter output signal.

The adaptation means can perform a minimum mean squared error algorithm based at least in part on the first error signal. The receiver circuitry can include decision-directed equalization means for performing a decision-directed equalization algorithm. The decision-directed equalization means can include second error computation means for computing a second error signal based at least in part on the filter output signal. The adaptation means can modify the plurality of filter values using a signal responsive to the second error signal.

In another embodiment, the constellation recovery means can include selector means for selecting a candidate constellation and mean squared error computation means for computing a mean squared error of a signal responsive to the input signal based on the selected candidate constellation. The constellation recovery means can also include occurrence comparison means for comparing a measured occurrence rate of the signal responsive to the input signal at a selected point in the candidate constellation to an expected occurrence rate of the signal responsive to the input signal at the selected point. The constellation recovery means can identify the constellation index based on results of the mean squared error means and the occurrence comparison means.

In yet another aspect of the invention, a computer program running on a processor can receive an input signal transmitted with a QAM constellation. The computer program can perform a blind equalization algorithm on the input signal and a constellation recovery algorithm on a signal responsive to the input signal to identify a constellation index corresponding to the QAM constellation. The computer program can alter the blind equalization algorithm based on the identified constellation index. In one embodiment, the computer program can perform the constellation recovery algorithm in response to substantial stabilization of at least one value of the blind equalization algorithm.

In another embodiment, the computer program can further perform a decision-directed equalization algorithm, which can occur in response to the constellation recovery algorithm identifying a constellation index. The blind equalization algorithm can filter a signal responsive to the input signal using a plurality of filter values to generate a filter output signal. The decision-directed equalization algorithm can modify the plurality of filter values based at least in part on the identified constellation index. The constellation recovery algorithm can compute a scaling factor based on the constellation index and scale a signal responsive to the filter output signal by the scaling factor to generate a scaled output signal. The decision-directed equalization algorithm can compare a signal responsive to the scaled output signal to at least one voltage threshold to generate a decision output signal, compute an error signal based on the scaled output signal and the decision output signal, and modify the plurality of filter values using a signal responsive to the first error signal.

In yet another embodiment, the blind equalization algorithm can filter a signal responsive to the input signal using a plurality of filter values to generate a filter output signal, compute a first error signal using a first error function, and modify the plurality of filter values using a signal responsive to the first error signal. The first error function can use a signal responsive to the filter output signal as an input, can remain substantially unchanged until the constellation index is identified, and can compute at least one second-order statistic from the signal responsive to the filter output signal.

The blind equalization algorithm can perform a minimum mean squared error algorithm based at least in part on the first error signal. The computer program can perform a decision-directed equalization algorithm. The decision-directed equalization algorithm can compute a second error signal based at least in part on the filter output signal and modify the plurality of filter values using a signal responsive to the second error signal.

In another embodiment, the constellation recovery algorithm can select a candidate constellation and compute a mean squared error of a signal responsive to the input signal based on the selected candidate constellation. The constellation recovery algorithm can also compare a measured occurrence rate of the signal responsive to the input signal at a selected point in the candidate constellation to an expected occurrence rate of the signal responsive to the input signal at the selected point. The constellation recovery algorithm can identify the constellation index based on the mean squared error the comparison of the measured occurrence rate to the expected occurrence rate.

The invention therefore allows for relatively efficient equalization of an input signal. Advantageously, the invention allows such equalization with relatively accurate performance and relatively low complexity.

BRIEF DESCRIPTION OF THE DRAWINGS

The above and other objects and advantages of the invention will be apparent upon consideration of the following detailed description, taken in conjunction with the accompanying drawings, in which like reference characters refer to like parts, and in which:

FIG. 2 depicts sample constellations that can be used for QAM;

DETAILED DESCRIPTION OF THE INVENTION

Figure 1:
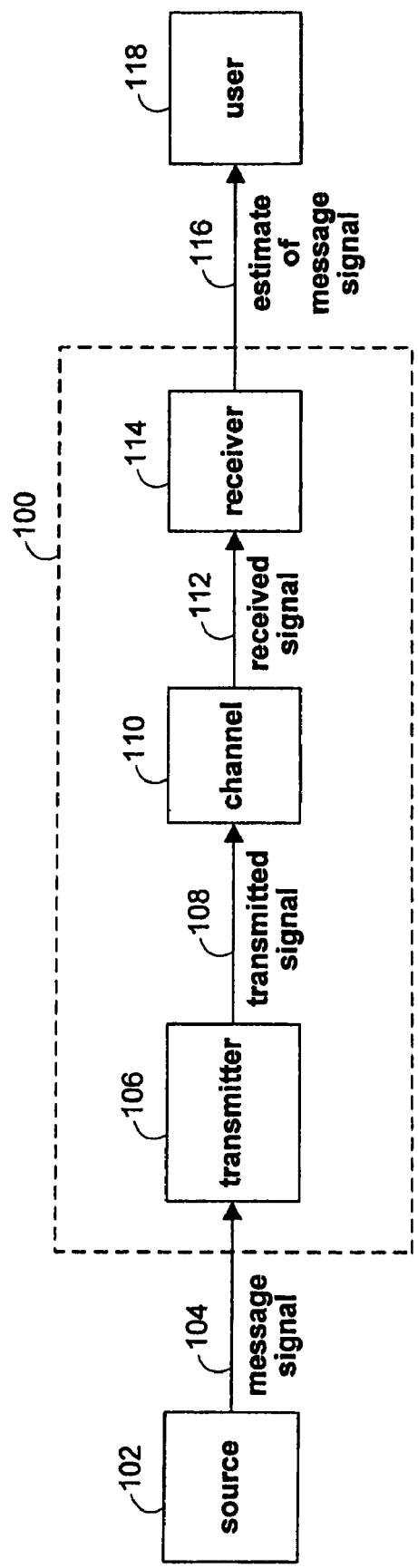
FIG. 1 depicts a block diagram of an illustrative communication system that can employ the disclosed technology.

FIG. 1 depicts a block diagram of an illustrative communication system 100 that can send information from a source 102 to a user 118. Source 102 can send a sequence of values known as a message signal 104 via a transmitter 106 that can use QAM to modulate a signal to encode message signal 104. A QAM constellation used by transmitter 106 is herein referred to as an "underlying constellation." A transmitted signal 108 carrying message signal 104 can travel across a channel 110 that potentially distorts transmitted signal 108 through various forms of corruption, such as dispersion, jitter, and noise. The nature and extent of the corruption displayed by a received signal 112 at the end of channel 110 can depend on individual channel characteristics that can be time-varying. A receiver 114 can process received signal 112 to generate an estimate 116 of message signal 104 to send to user 118.

The invention disclosed herein can advantageously compensate for corruption from channel 110, and can be used in receiver 114.

FIG. 2 depicts sample constellations 200 that can be used for QAM. The constellations depicted are "16-QAM" 202, "32-QAM" 204, and "64-QAM" 206, where the numbers 16, 32, and 64, refer to the number of signal points in the constellation, also known as a "constellation size." Each constellation depicts its signal points 216 on a graph whose horizontal axis 212 and vertical axis 214 represent the amplitudes of, respectively, the in-phase and quadrature signals of QAM. Each signal point 216 represents a corresponding string of values 218, such that a series of signal points 216 can represent a message signal (e.g., message signal 104 of FIG. 1). For ease of illustration, the values discussed herein are generally binary in nature. However, it will be understood that any appropriate types of values can be used.

16-QAM 202 and 64-QAM 206 are square constellations, meaning the signal points of the constellation are graphed in a square formation. Each square constellation has four cornerpoints 220, which are signal points at the corners of the square formation. Other constellation sizes may also form square constellations, such as a 256-QAM that has 256 signal points. In contrast, 32-QAM 204 is a cross constellation, meaning the signal points of the constellation are graphed in a cross formation. A cross formation differs from a square formation because it lacks signal points at the corners 222 of the formation. Other constellation sizes may also form cross constellations, such as a 128-QAM that has 128 signal points in a square formation missing 4 signal points at each corner. It will be noted that, for ease of illustration, only a quarter of the signal points of 64-QAM 206 are shown.

Figure 3:
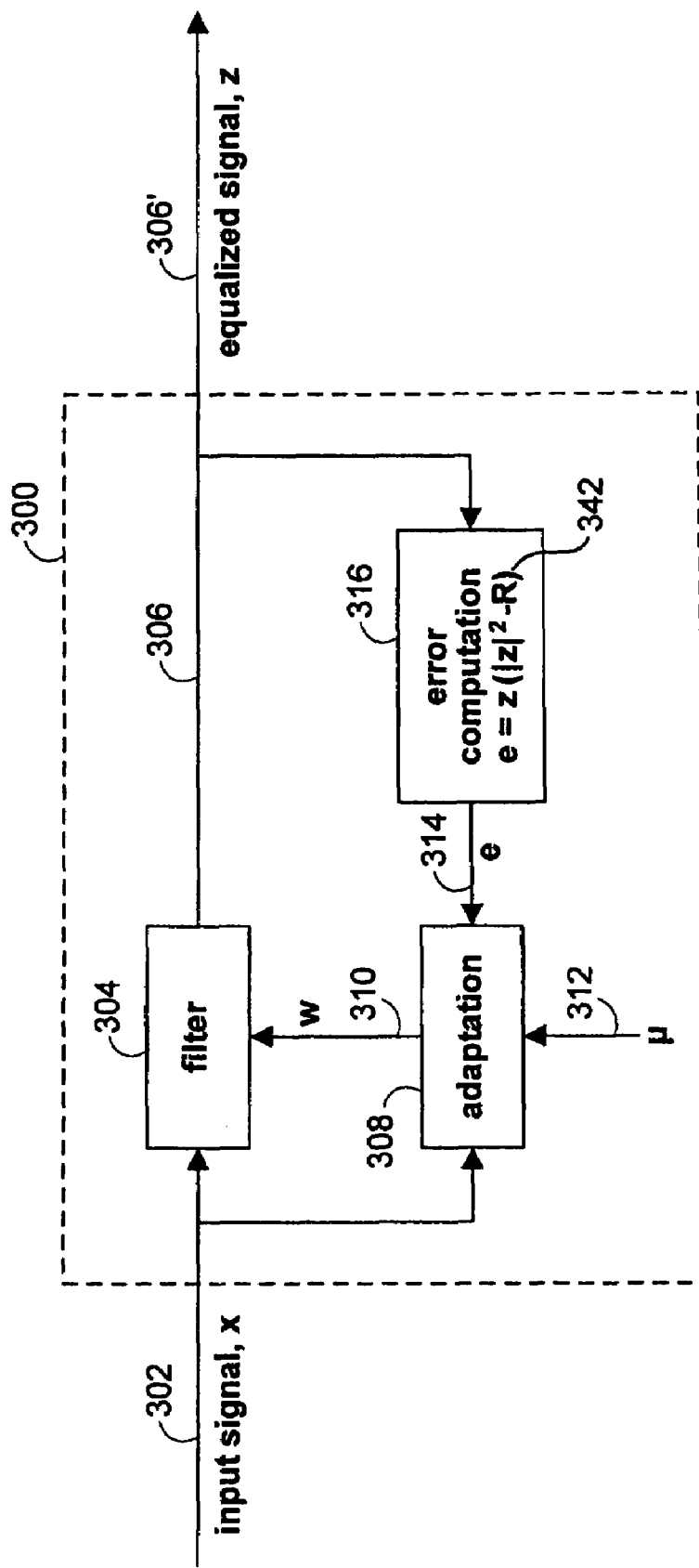
FIG. 3 depicts a block diagram of illustrative blind equalization circuitry.

FIG. 3 depicts a block diagram of known illustrative blind equalization circuitry 300 for equalizing an input signal 302 transmitted using QAM with a known underlying constellation. Input signal 302 can be received by a receiver, such as receiver 114 of FIG. 1. The constellation can be of any size or formation, such as sample constellations 200 depicted in FIG. 2. Blind equalization circuitry 300 can include an adaptive filter 304, error computation circuitry 316, and adaptation circuitry 308. Based on a result generated by error computation circuitry 316, adaptation circuitry 308 can modify adaptive filter 304 to generate an equalized signal 306'. In one embodiment, input signal 302 can be processed by adaptive filter 304 to generate filter output signal 306. Adaptive filter 304 preferably convolves input signal 302 with a plurality of filter values 310, which are modifiable.

Filter output signal 306 can be processed by error computation circuitry 316 to generate an error signal 314. Error computation circuitry 316 can use an error function 342, which preferably uses a second-order statistic of filter output signal 306. In one embodiment, error function 342 can be $$e = z(|z|^2 - R),$$

where e is a value of error signal 314, z is a corresponding value of filter output signal 306, and R is a constant whose value depends on the size of the underlying constellation.

Error signal 314 can be processed by adaptation circuitry 308 to generate the plurality of filter values 310 for adaptive filter 304. Adaptation circuitry 308 preferably uses a minimum mean squared error (MMSE) algorithm to modify the plurality of filter values 310. In one embodiment, the adaptation can perform a least mean square (LMS) algorithm, which has as inputs error signal 314, input signal 302, and an adaptation constant 312. LMS algorithms are well known in the art as a method for progressively approaching a state with relatively low error. In one implementation, LMS algorithm can update a vector $w_k$ containing the plurality of filter values 310 using the following equation:

$$w_{k+1} = w_k + \mu e_k x_k,$$

where $w_{k+1}$ is a vector of a next plurality of filter values 310, $w_k$ is a vector of a current plurality of filter values 310, $\mu$ is adaptation constant 312, $e_k$ is a current value of error signal 314, and $x_k$ is a vector of both current and past values of input signal 302.

If R has a value corresponding to the size of the underlying constellation, over time the plurality of filter values 310 can converge and filter output signal 306 can have a substantially high signal-to-noise ratio (SNR). At this point, filter output signal 306 can generate an equalized signal 306' substantially free of channel corruption.

Figures 4, 5:
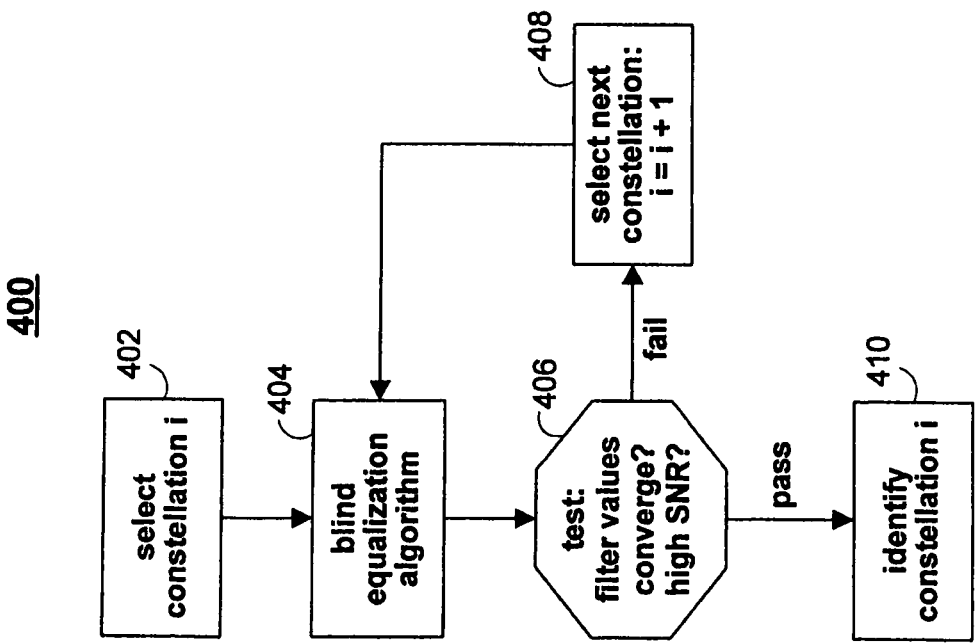
FIG. 4 depicts a flow diagram of an illustrative equalization algorithm.
FIG. 5 depicts a table of illustrative R values that can be used in the blind equalization circuitry of FIG. 3.

FIG. 4 depicts a flow diagram of a known illustrative equalization algorithm 400 for an input signal transmitted using QAM with an unknown underlying constellation. In this case, although the underlying constellation is not known, a set of candidate constellations is known. Equalization algorithm 400 can perform multiple blind equalization training algorithms, each corresponding to a different candidate constellation from the set of candidate constellations, and then select the candidate constellation with the best performance.

In one embodiment of equalization algorithm 400, step 402 can select a candidate constellation having a constellation index i. Step 404 can then perform a blind equalization algorithm on the input signal, based on the assumption that candidate constellation i is the underlying constellation. Step 406 can then test how well step 404 has equalized the input signal. The blind equalization algorithm of step 404 is preferably similar to the method performed by blind equalization circuitry 300 depicted in FIG. 3, in which case step 406 preferably checks whether or not the plurality of filter values 310 converges and filter output signal 302 has a substantially high SNR.

If the blind equalization algorithm of step 404 passes the test of step 406, then equalization algorithm 400 can perform step 410, which can identify candidate constellation i as the underlying constellation used to encode the input signal. If the blind equalization algorithm of step 404 fails the test of step 406, then equalization algorithm 400 can perform step 408, which can select the next candidate constellation i+1, and cycle back to step 404, continuing the cycle until step 410 is reached.

FIG. 5 depicts a table 500 of known illustrative R values that can be used in blind equalization circuitry 300 of FIG. 3. In particular, the illustrative R values can be used in error function 342 described above in reference to FIG. 3. Column 502 contains different constellation indices, i. Column 504 contains the constellation sizes corresponding to the constellation indices of column 502. Column 506 contains the illustrative R values corresponding to the constellation sizes of column 504. Each R value is preferably approximately proportional to its corresponding constellation size.

Figure 6:
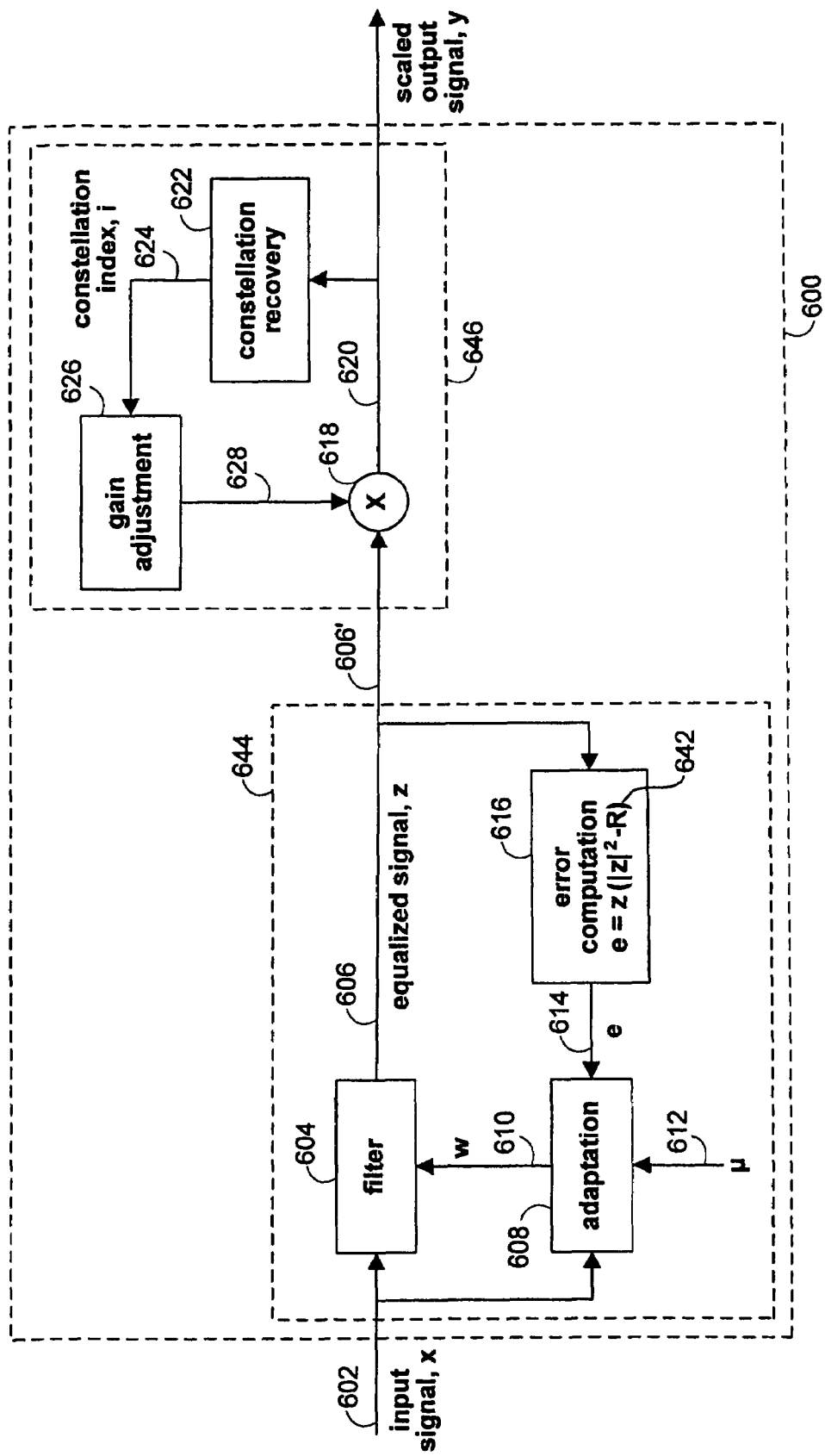
FIG. 6 depicts a block diagram of illustrative equalization circuitry in accordance with an embodiment of the invention.

FIG. 6 depicts a block diagram of illustrative equalization circuitry 600 in accordance with an embodiment of the invention. Equalization circuitry 600 can be used in a situation where the underlying constellation is not known, but a set of candidate constellations is known. In one embodiment, the candidate constellations can be any square or cross constellations, such as sample constellations 200 depicted in FIG. 2.

Input signal 602 can be received by a receiver, such as receiver 114 of FIG. 1. Equalization circuitry 600 can process input signal 602 using blind equalization circuitry 644 in a fashion similar to that of blind equalization circuitry 300 described above in reference to FIG. 3. Once blind equalization circuitry 644 has substantially stabilized at least one filter value of filter circuitry 604, equalization circuitry 600 can identify the underlying constellation and scale equalized signal 606' using constellation recovery circuitry 646. In accordance with an embodiment of the invention, equalization circuitry 600 is configured to run a blind equalization algorithm once, as opposed to multiple times. Such a configuration can result in a significant reduction in computational complexity, even when the computation of constellation recovery circuitry 646 is taken into account. For example, if blind equalization circuitry 300 requires approximately 250 values of input signal 302 to select a constellation from a set of 5 candidate constellations, equalization circuitry 600 might require only about 60 values of input signal 602 to perform the same selection.

Blind equalization circuitry 644 can include an adaptive filter 604, error computation circuitry 616, and adaptation circuitry 608. The structure and operation of blind equalization circuitry 644 can generally be similar to those of blind equalization circuitry 300. Therefore, it is not deemed necessary to describe blind equalization circuitry 644 in significant detail. One difference between blind equalization circuitry 644 and blind equalization circuitry 300, however, is that blind equalization circuitry 644 can preferably scale input signal 602 so that it has approximately unit energy, meaning the maximum amplitudes of the in-phase and quadrature signals are each approximately equal to a reference level of unit energy. In accordance with an embodiment of the invention, error computation circuitry 616 can maintain the same value of R throughout the blind equalization process, instead of varying it to match each candidate constellation, as performed by blind equalization circuitry 300. By performing blind equalization using only a single value of R, blind equalization circuitry 644 can advantageously equalize input signal 602 without determining which constellation was used to encode input signal 602, thereby substantially reducing the amount of computation required.

In accordance with an embodiment of the invention, constellation recovery circuitry 646 can be operable to receive equalized signal 606' from blind equalization circuitry 644 and identify the constellation used to encode input signal 602. After constellation recovery circuitry 646 identifies the underlying constellation of input signal 602, it can scale equalized signal 606' to have substantially the same amount of energy as a signal that has been modulated using the underlying constellation. In one embodiment, constellation recovery circuitry 646 can include scaler circuitry 618, constellation recovery circuitry 622, and gain adjustment circuitry 626. Scaler circuitry 618 can scale equalized signal 606' by a scaling factor 628 to generate a scaled output signal 620. Scaled output signal 620 can be processed by constellation recovery circuitry 622, whose operation is described below in reference to FIG. 9, to generate a constellation index 624. Constellation index 624 can in turn be processed by gain adjustment circuitry 626 to generate scaling factor 628. In one embodiment, gain adjustment circuitry 626 can generate a scaling factor 628 that is substantially equal to a square root of a ratio of energies. The ratio of energies can be a fraction whose numerator is the amount of energy of a signal modulated using a constellation with constellation index 624, and whose denominator is the unit energy described above. Scaled output signal 620 preferably represents an equalized signal having substantially the same energy as a signal transmitted using QAM with the underlying constellation.

Figure 7:
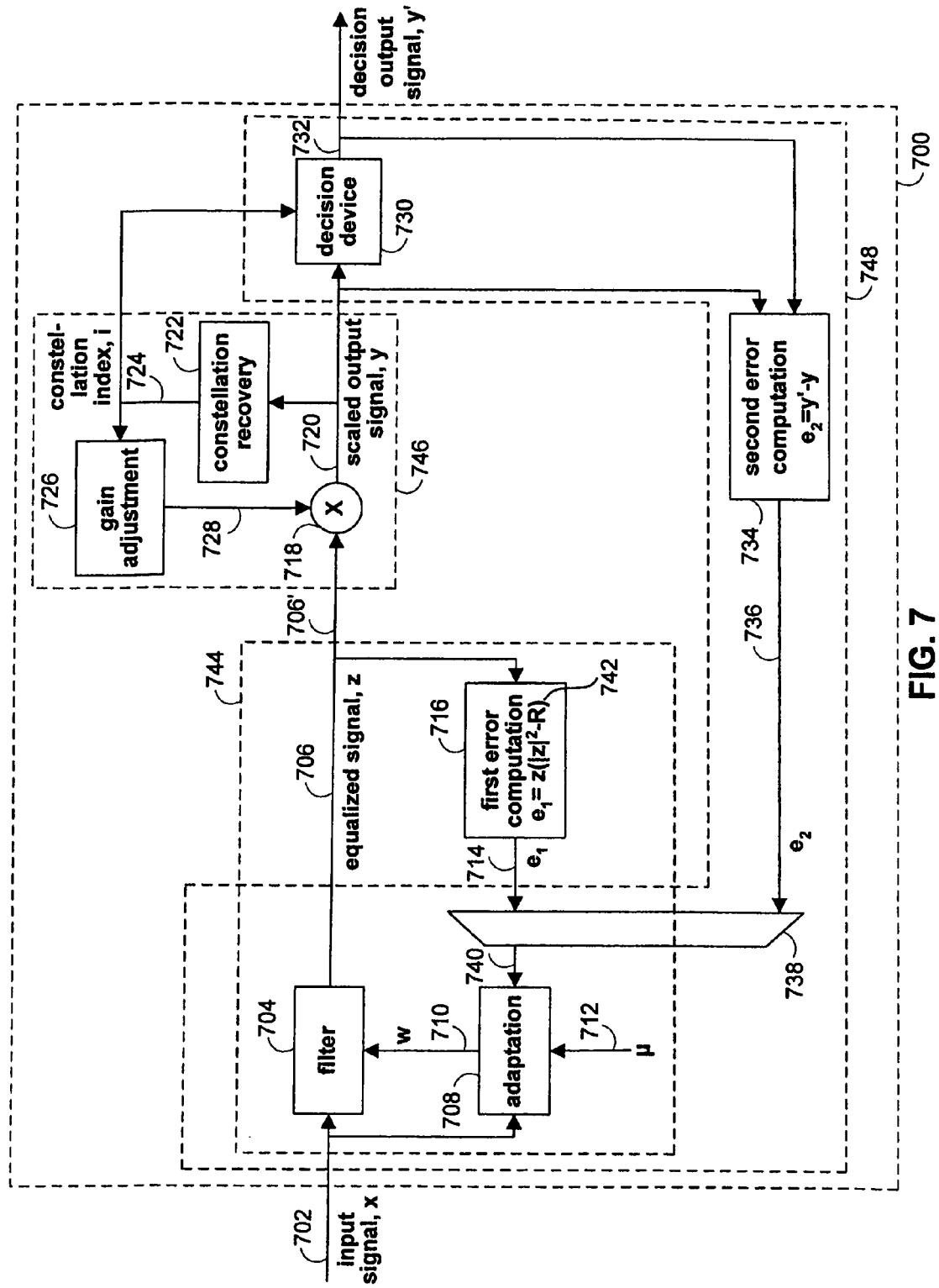
FIG. 7 depicts a block diagram of alternative illustrative equalization circuitry in accordance with an embodiment of the invention.

FIG. 7 depicts a block diagram of illustrative equalization circuitry 700 in accordance with an embodiment of the invention. Equalization circuitry 700 can be used in a situation where the underlying constellation is not known, but a set of candidate constellations is known. In one embodiment, the candidate constellations can be any square or cross constellations, such as sample constellations 200 depicted in FIG. 2.

Equalization circuitry 700 can first perform blind equalization using blind equalization circuitry 744, which can be similar to blind equalization circuitry 300 described above in reference to FIG. 3. Once blind equalization circuitry 744 has substantially stabilized at least one filter value of filter circuitry 704, equalization circuitry 700 can perform constellation recovery using constellation recovery circuitry 746, which is capable of identifying the underlying constellation and scaling equalized signal 706'. Constellation recovery circuitry 746 is preferably similar to constellation recovery circuitry 646 of FIG. 6.

Using constellation recovery circuitry 746, equalization circuitry 700 can also alter blind equalization circuitry 744, either concurrently with the operation of constellation recovery circuitry 746 or after constellation recovery circuitry 746 has identified a constellation index 724. In one embodiment, equalization circuitry 700 can alter blind equalization circuitry 744 using decision-directed equalization circuitry 748, which is coupled to constellation recovery circuitry 746. (It will be understood that the term "coupled," as used herein, can define either a direct or an indirect connection between elements.) As a result of using decision-directed equalization circuitry 748, equalization circuitry 700 can require more hardware and computation than equalization circuitry 600, but can also generate a more accurate equalized signal 706'. The differences in accuracy are discussed below and demonstrated by example in reference to FIGS. 11 and 12.

Multiplexer 738 can be operable to receive first error signal 714 and second error signal 736 as inputs, and generate a multiplexer output signal 740. Multiplexer 738 preferably selects first error signal 714 when equalization circuitry 700 is performing blind equalization using blind equalization circuitry 744. In this case, multiplexer output signal 740 can be processed by adaptation circuitry 708 to generate the plurality of filter values 710 for adaptive filter 704, as discussed above with reference to FIG. 3.

In accordance with an embodiment of the invention, the accuracy of equalized signal 706' can be improved by selecting second error signal 736 with multiplexer 738. Second error signal 736 can generally represent the amount of error present in equalized signal 706'. In particular, second error signal 736 can be generated by decision-directed equalization circuitry 748, which can include a decision device 730 and second error computation circuitry 734. Decision device 730 can select a signal point from the constellation with constellation index 724 to match a value of scaled output signal 720, using any appropriate metric (e.g., proximity in the I/Q plane). In one embodiment, decision device 730 can generate a decision output signal 732 whose values can each represent a signal point from the constellation having constellation index 724. Signal points represented by values of decision output signal 732 are preferably relatively close in value to a corresponding value of scaled output signal 720. Second error computation circuitry 734 can use scaled output signal 720 and decision output signal 732 to compute second error signal 736. In one implementation, each element of second error signal 736 can be a difference between a value of decision output signal 732 and a corresponding value of scaled output signal 720.

By selecting second error signal 736, multiplexer 738 can feedback information about equalized signal 706' to blind equalization circuitry 744. In particular, multiplexer 738 preferably selects second error signal 736 when equalization circuitry 700 is performing decision-directed equalization using decision-directed equalization circuitry 748. In this case, as in the case above when first error signal 714 is selected, multiplexer output signal 740 can be processed by adaptation circuitry 708 to generate the plurality of filter values 710 for adaptive filter 704.

Decision-directed equalization circuitry 748 can advantageously reduce the corruption displayed by equalized signal 706', thereby allowing decision device 730 to more accurately select signal points that represent a message signal encoded in input signal 702. In particular, if equalized signal 706' displays less corruption, then a scaled version of equalized signal 706', such as scaled output signal 720, may also display less corruption. As a result, a value of scaled output signal 720 is more likely to be mapped to the correct constellation signal point by decision device 730. Thus, decision output signal 732 is more likely to contain values that accurately represent the encoded message.

Figure 8:
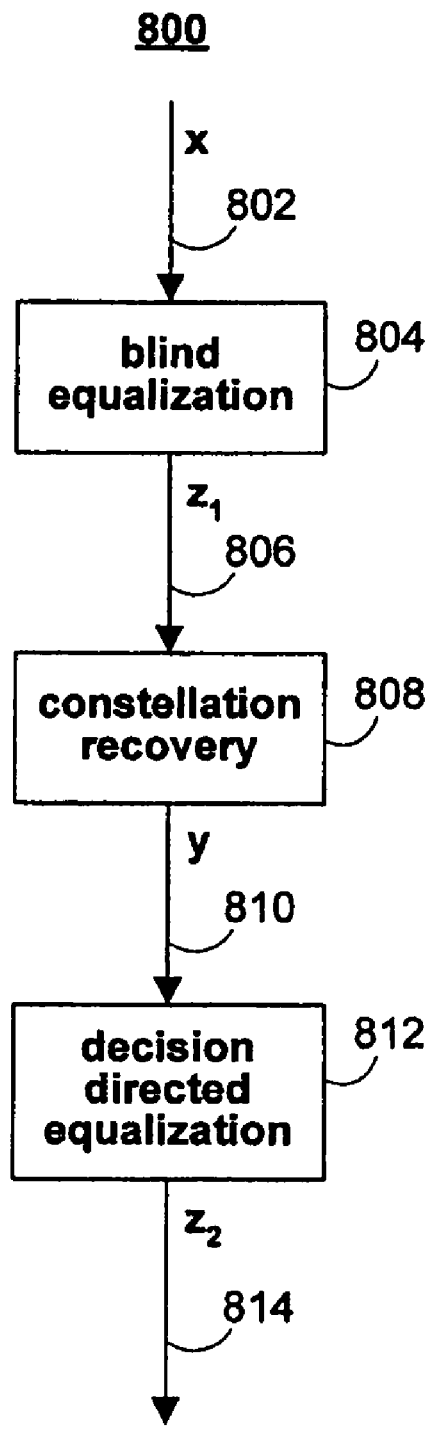
FIG. 8 depicts a flow diagram of an illustrative equalization algorithm in accordance with an embodiment of the invention.

FIG. 8 depicts a flow diagram of an illustrative efficient equalization algorithm 800 which starts with the receipt of an input signal 802, transmitted using QAM with an unknown underlying constellation. Input signal 802 can be received by a receiver, such as receiver 114 of FIG. 1. Although the underlying constellation is not known, a set of candidate constellations is known. In one embodiment, the candidate constellations can be any square or cross constellations, such as sample constellations 200 depicted in FIG. 2.

Step 804 can perform a blind equalization algorithm on input signal 802 to generate a first equalized signal 806. This blind equalization algorithm of step 804 can filter a signal coupled to input signal 802 using a plurality of filter values that are modifiable. Step 804 can also compute a first error signal that can be used to modify the plurality of filter values. The blind equalization algorithm of step 804 can be similar to that of step 404 of FIG. 4 and those performed by blind equalization circuitries 300, 644, and 744 described above in reference to FIGS. 3, 6, and 7, respectively.

Step 808 can perform a constellation recovery algorithm on first equalized signal 806 to generate a scaled output signal 810. This constellation recovery algorithm can identify a constellation index, and then use the identified constellation index to scale first equalized signal 806. Step 808 can use a constellation recovery subalgorithm similar to an algorithm 900 described below in reference to FIG. 9. The constellation recovery algorithm of step 808 can be similar to that used by constellation recovery circuitries 646 and 746 described above in reference to FIGS. 6 and 7, respectively.

Step 812 can perform a decision-directed equalization algorithm on scaled output signal 810 to generate a second equalized signal 814. This decision-directed equalization algorithm can further modify the plurality of filter values of step 804. Step 812 can select a signal point closest in value to a corresponding value of scaled signal 810, and compute a second error signal that can be used to modify the plurality of filter values. The decision-directed equalization algorithm of step 812 can be similar to that performed by decision-directed equalization circuitry 748 described above in reference to FIG. 7.

In another embodiment, step 808 and step 812 can perform the constellation recovery of step 808 and decision-directed equalization algorithm of step 812 concurrently. In yet another embodiment, efficient equalization algorithm 800 can perform steps 804 and 808 without performing step 812, similar to the embodiment described above in FIG. 6.

Figure 9:
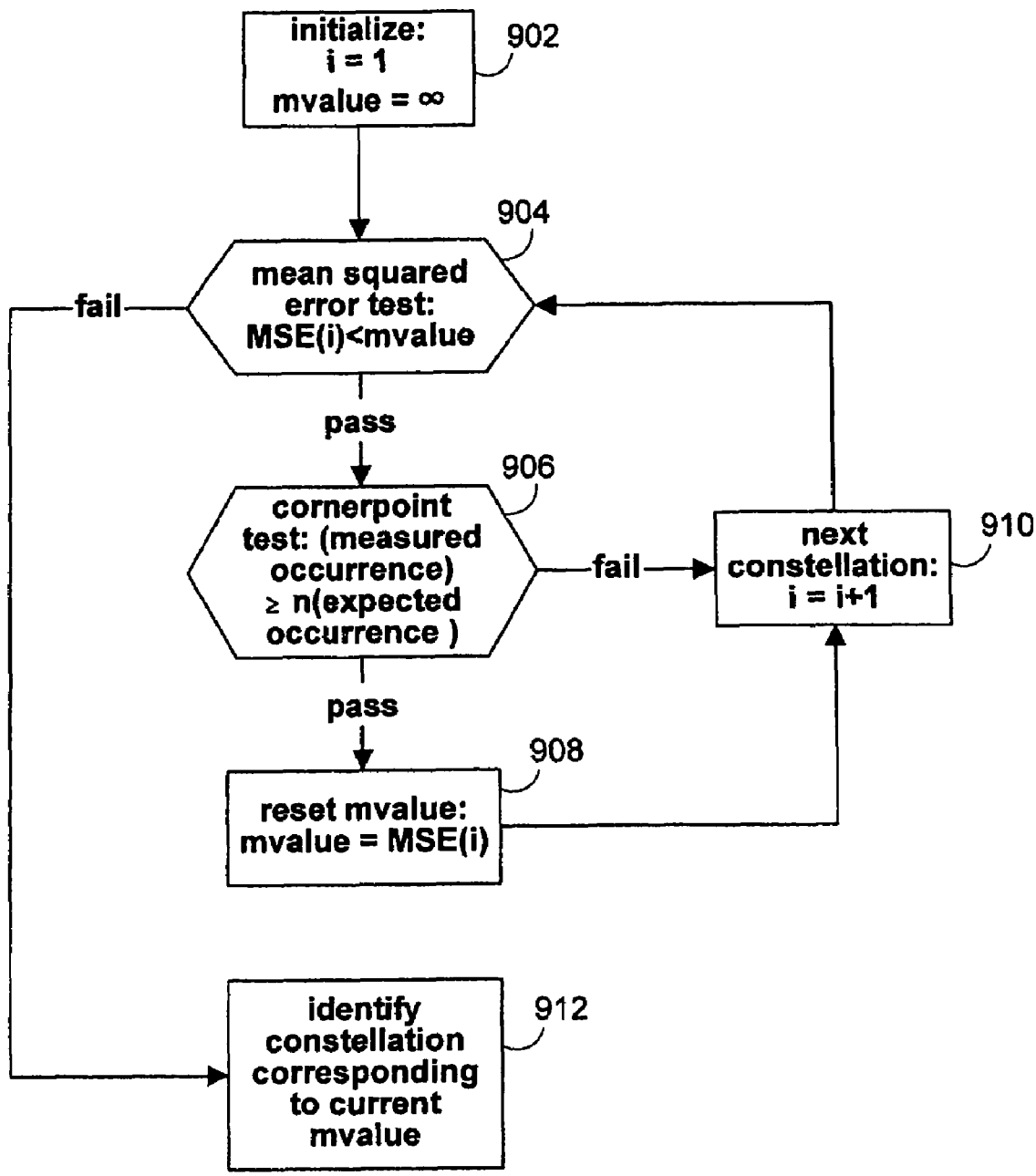
FIG. 9 depicts a flow diagram of an illustrative constellation recovery subalgorithm in accordance with an embodiment of the invention.

FIG. 9 depicts a flow diagram of an illustrative constellation recovery subalgorithm 900 which can identify a constellation index for an input signal transmitted using QAM with an unknown underlying constellation. Although the underlying constellation is not known, a set of candidate constellations is known. In one embodiment, the candidate constellations can be any square or cross constellations, such as sample constellations 200 depicted in FIG. 2.

Constellation recovery subalgorithm 900 preferably includes at least one test for evaluating whether or not to identify a candidate constellation index as corresponding to the underlying constellation, and can consecutively apply tests to different candidate constellations. Constellation recovery subalgorithm 900 can be performed by constellation recovery circuitries 646 and 746 of FIGS. 6 and 7, respectively, and constellation recovery algorithm 808 of FIG. 8. It will be noted that other algorithms for constellation recovery can be used and that the algorithms described herein are for illustrative purposes only.

Constellation recovery subalgorithm 900 can initialize at step 902 by selecting initial values for any indices used in subalgorithm 900. In one embodiment, step 902 can select an initial candidate constellation index i to consider, preferably selecting the constellation index i=1, and can set a threshold index, mvalue, to a value, which is preferably infinity.

Step 904 can perform a first test that measures how well the input signal represents signal points of the candidate constellation whose index is currently selected. The first test can generate a value which can be compared to a threshold value. In one embodiment, step 904 can compute an error based on two values: a value of the input signal and a corresponding value representing a signal point in the current candidate constellation that is closest to the input value. The error can be based on a difference between the two elements. Step 904 preferably computes a mean squared error, MSE(i), by averaging a plurality of squared differences. Step 904 then compares the mean squared error to mvalue. Alternatively, step 904 can perform a SNR test (e.g., computing a SNR for the signal coupled to the input signal and comparing it to a SNR threshold index).

If the currently selected constellation index passes the first test (e.g., if the mean squared error is less than mvalue, or the SNR is greater than the SNR threshold index), then constellation recovery subalgorithm 900 can proceed to step 906. If not, then subalgorithm 900 can proceed to step 912, which can end subalgorithm 900. Step 912 preferably identifies the constellation corresponding to the current index as the underlying constellation of the input signal.

Step 906 can perform a second test that measures how well the input signal statistically represents the variety of signal points of the current candidate constellation. More specifically, the second test can measure how well the input signal generates signal points according to a uniform probability distribution over all possible signal points of the current candidate constellation.

A uniform probability distribution over a finite set of outcomes means that each outcome of the set is probabilistically equally likely to occur. Given a sufficient number of experiments, where each experiment independently generates an outcome according to a uniform probability distribution, each outcome has the same expected occurrence rate. An expected occurrence rate of an outcome is the expected ratio of the number of experiments that generate the outcome to the total number of experiments. Alternatively, the second test can use a probability distribution that more closely represents the expected occurrence rates of the signal points (e.g., if the data conveyed by the input signal has known properties that make its distribution substantially non-uniform).

In one embodiment, step 906 can compare the expected occurrence rate for at least one signal point to a measured occurrence rate of that at least one signal point. Here, the measured occurrence rate of an outcome is the ratio of the number of experiments that generate the outcome to the total number of experiments. If the set of candidate constellations includes a square constellation, such as 16-QAM 202, 64-QAM 206, and 256-QAM 210 described above in reference to FIG. 2, step 906 can compare the expected occurrence rate to the measured occurrence rate for at least one corner-point of the square constellation. Such a test is called a "cornerpoint test." If the set of candidate constellations includes a cross constellation, such as 32-QAM 204 or 128-QAM 208 described above in reference to FIG. 2, step 906 can still perform the cornerpoint test, but the expected occurrence rate of a cornerpoint for a cross constellation will be zero.

In one implementation, the currently selected constellation index can pass the cornerpoint test if the measured occurrence rate is greater than or substantially equal to the expected occurrence rate multiplied by a factor n, where n is preferably less than or substantially equal to 1. For example, if n is set to be 1/16, then the currently selected constellation index passes the corner point test if the measured number of occurrences of cornerpoints is at least one-sixteenth of the expected number of occurrences of cornerpoints. More generally, if the measured occurrence rate of some set of signal points is not above some threshold based on the expected occurrence rate of that set of signal points, then the currently selected constellation index can fail the cornerpoint test.

If the currently selected constellation index passes the second test, then constellation recovery subalgorithm 900 can proceed to step 908, which can reset any threshold indices to reflect that the currently selected constellation index passed both tests. For example, if the first test is a mean squared error test, then step 908 can set mvalue to the mean squared error corresponding to the currently selected constellation index, MSE(i). Constellation recovery subalgorithm 900 can then proceed to step 910. If the currently selected constellation index fails the second test, then subalgorithm 900 can proceed to step 910 without performing step 908.

Step 910 can select the next constellation index to consider, and preferably selects the next highest index, i+1. Constellation recovery subalgorithm 900 can then cycle back to step 904 to run the tests using the next constellation index.

Constellation recovery subalgorithm 900 can advantageously have more than one test to identify a constellation index. Because some tests are better suited for certain types of channels than others, having more than one test can more accurately identify a constellation index for a wider variety of channels. For example, the mean squared error test alone can potentially identify an incorrect constellation index given a channel with significant noise. In addition, the mean squared error test can be biased towards constellations with a greater number of signal points, because the mean squared error of a relatively dense constellation will tend to be lower than the mean squared error of a relatively sparse constellation. On the other hand, the mean squared error test used in conjunction with the cornerpoint test can display more accuracy, without requiring significantly more computations to implement.

Figure 10:
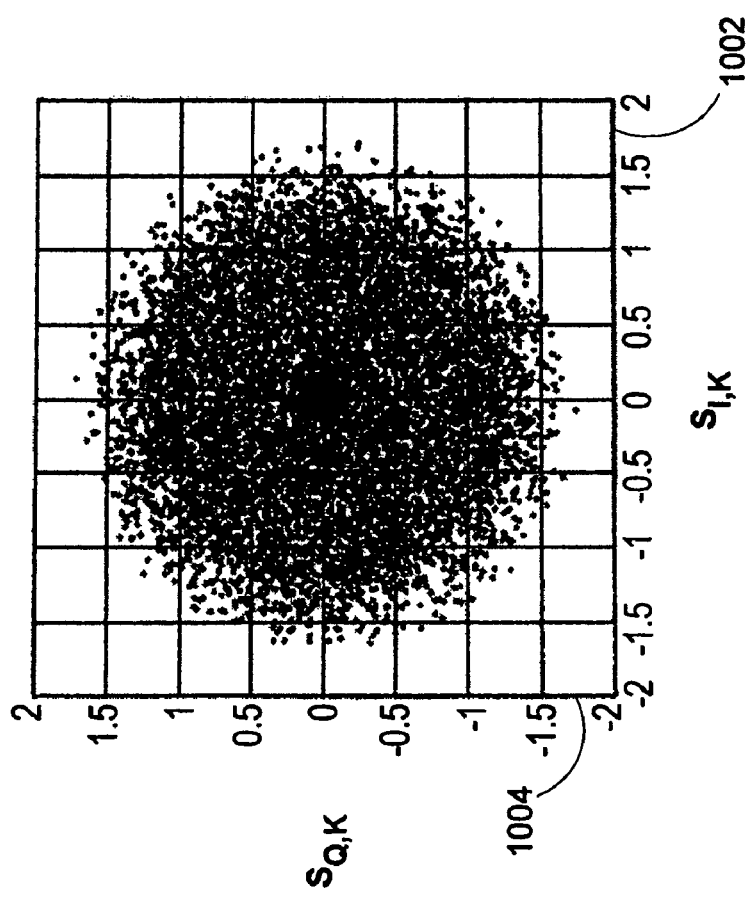
FIG. 10 depicts a graph of an illustrative sampling of an input signal with an unknown constellation.

FIG. 10 depicts a graph of an illustrative sampling 1000 of an input signal transmitted using QAM, which can be similar to input signals 302, 602, and 702 of FIGS. 3, 6, and 7, respectively. In this illustrative example, the underlying constellation of the input signal is a square constellation having 256 signal points. A horizontal axis 1002 and a vertical axis 1004 represent the amplitudes of, respectively, the in-phase and quadrature signals of the input signal. The input signal displays significant corruption—neither signal point locations nor a square constellation shape are readily discernible.

Figure 11:
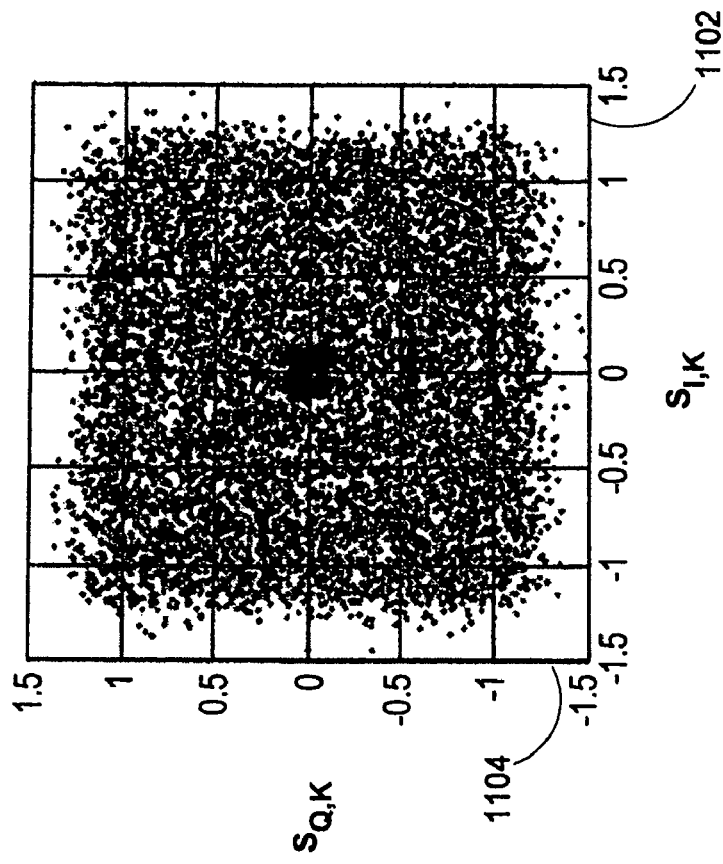
FIG. 11 depicts a graph of an illustrative sampling of a signal that has been equalized in accordance with an embodiment of the invention.

FIG. 11 depicts a graph of an illustrative sampling 1100 of an equalized signal, similar to equalized signals 606' and 706' of FIGS. 6 and 7, respectively, generated by blind equalization circuitry similar to blind equalization circuitries 644 and 744 of FIGS. 6 and 7, respectively. In this illustrative example, the equalized signal is coupled to an input signal whose underlying constellation is a square constellation having 256 signal points, similar to the input signal of FIG. 10. A horizontal axis 1102 and a vertical axis 1104 represent the amplitudes of, respectively, the in-phase and quadrature signals of the input signal. The equalized signal is preferably sampled after the equalization algorithm has substantially stabilized at least one filter value. It will be noted that the equalized signal displays less corruption than the input signal of FIG. 10, as the square constellation shape is somewhat discernible, but the number of signal points is still not readily discernible.

Figure 12:
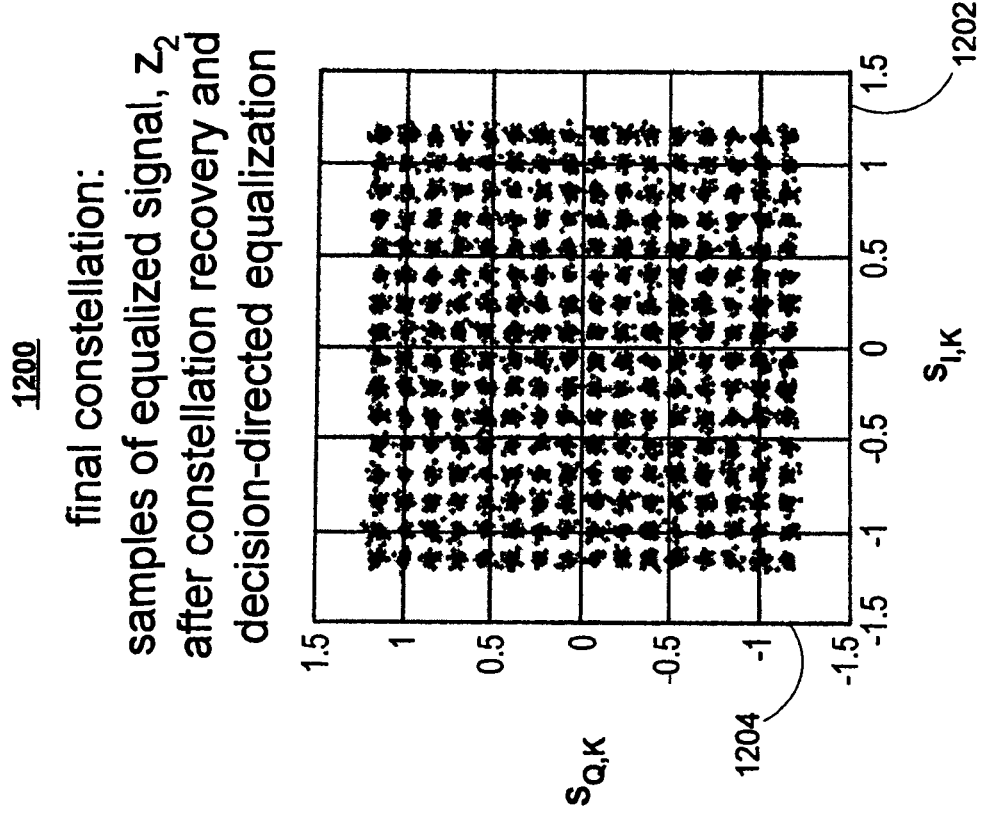
FIG. 12 depicts a graph of another illustrative sampling of a signal that has been equalized in accordance with an embodiment of the invention.

FIG. 12 depicts a graph of an illustrative sampling 1200 of an equalized signal, similar to equalized signal 706' of FIG. 7, generated by decision-directed equalization circuitry similar to decision-directed equalization circuitry 748 of FIG. 7. In this illustrative example, the equalized signal is coupled to an input signal whose underlying constellation is a square constellation having 256 signal points, similar to the input signal of FIG. 10. A horizontal axis 1202 and a vertical axis 1204 represent the amplitudes of, respectively, the in-phase and quadrature signals of the input signal. The equalized signal is sampled after the constellation recovery algorithm has identified the underlying constellation and after the decision-directed equalization algorithm has substantially stabilized at least one filter value. It will be noted that the equalized signal displays significantly less corruption than the signals of FIGS. 10 and 11—the square constellation shape, number of signal points, and locations of signals points are all readily discernible.

Referring now to FIGS. 13A-13E, various exemplary implementations of the present invention are shown.

Figure 13A:
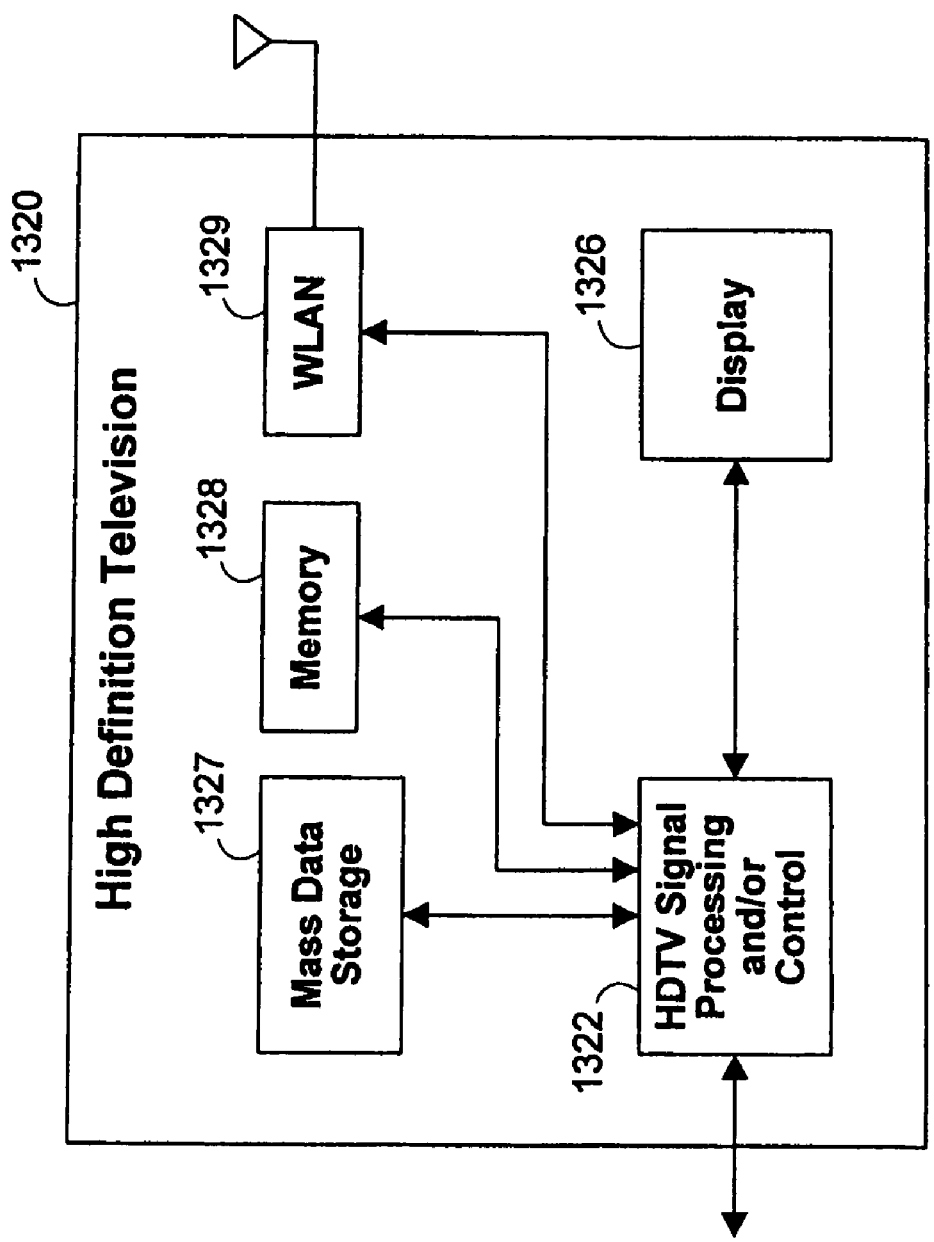
FIG. 13A is a block diagram of an exemplary high definition television that can employ the disclosed technology.

Referring now to FIG. 13A, the present invention can be implemented in a high definition television (HDTV) 1320. The present invention may implement either or both signal processing and/or control circuits, which are generally identified in FIG. 13A at 1322, a WLAN interface and/or mass data storage of the HDTV 1320. The HDTV 1320 receives HDTV input signals in either a wired or wireless format and generates HDTV output signals for a display 1326. In some implementations, signal processing circuit and/or control circuit 1322 and/or other circuits (not shown) of the HDTV 1320 may process data, perform coding and/or encryption, perform calculations, format data and/or perform any other type of HDTV processing that may be required.

The HDTV 1320 may communicate with mass data storage 1327 that stores data in a nonvolatile manner, such as optical and/or magnetic storage devices, for example hard disk drives HDD and/or DVDs. The HDD may be a mini HDD that includes one or more platters having a diameter that is smaller than approximately 1.8". The HDTV 1320 may be connected to memory 1328 such as RAM, ROM, low latency nonvolatile memory such as flash memory and/or other suitable electronic data storage. The HDTV 1320 also may support connections with a WLAN via a WLAN network interface 1329.

Figure 13B:
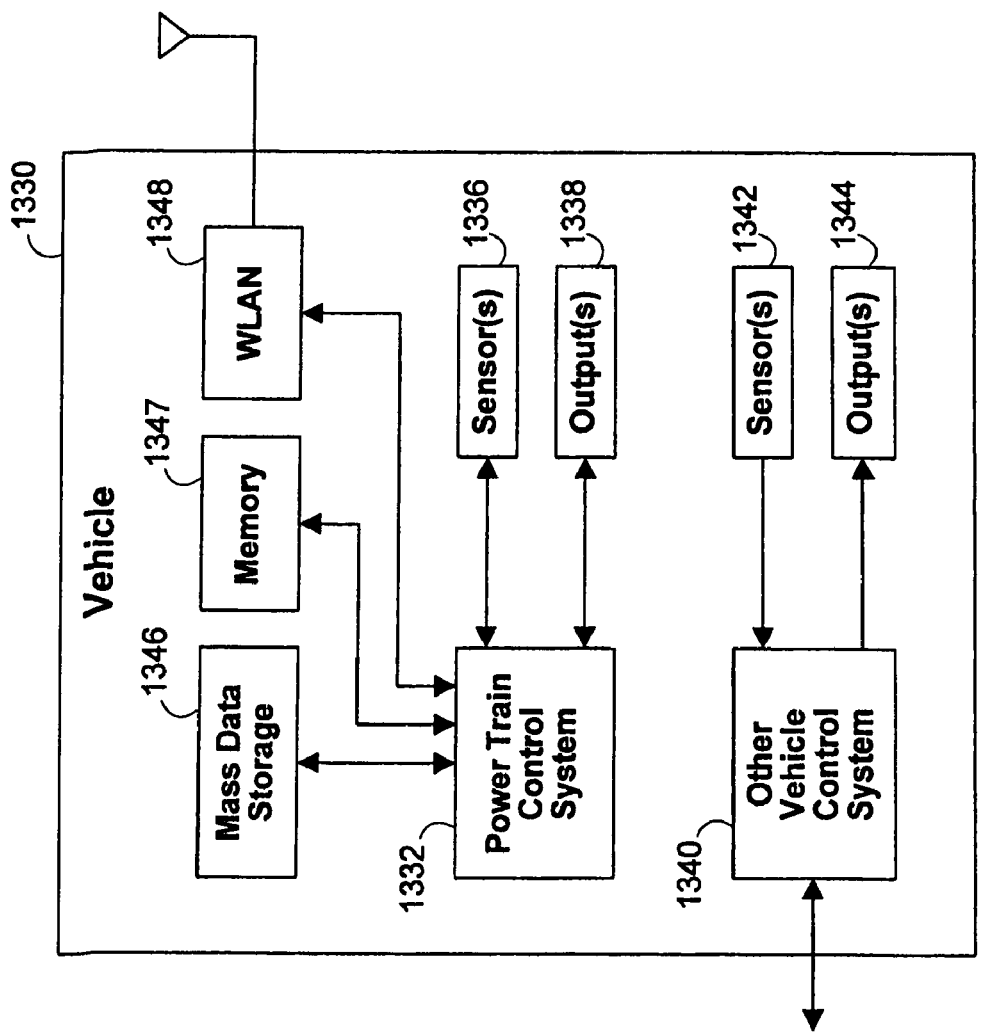
FIG. 13B is a block diagram of an exemplary vehicle that can employ the disclosed technology.

Referring now to FIG. 13B, the present invention implements a control system of a vehicle 1330, a WLAN interface and/or mass data storage of the vehicle control system. In some implementations, the present invention may implement a powertrain control system 1332 that receives inputs from one or more sensors such as temperature sensors, pressure sensors, rotational sensors, airflow sensors and/or any other suitable sensors and/or that generates one or more output control signals such as engine operating parameters, transmission operating parameters, and/or other control signals.

The present invention may also be implemented in other control systems 1340 of the vehicle 1330. The control system 1340 may likewise receive signals from input sensors 1342 and/or output control signals to one or more output devices 1344. In some implementations, the control system 1340 may be part of an anti-lock braking system (ABS), a navigation system, a telematics system, a vehicle telematics system, a lane departure system, an adaptive cruise control system, a vehicle entertainment system such as a stereo, DVD, compact disc and the like. Still other implementations are contemplated.

The powertrain control system 1332 may communicate with mass data storage 1346 that stores data in a nonvolatile manner. The mass data storage 1346 may include optical and/or magnetic storage devices for example hard disk drives HDD and/or DVDs. The HDD may be a mini HDD that includes one or more platters having a diameter that is smaller than approximately 1.8". The powertrain control system 1332 may be connected to memory 1347 such as RAM, ROM, low latency nonvolatile memory such as flash memory and/or other suitable electronic data storage. The powertrain control system 1332 also may support connections with a WLAN via a WLAN network interface 1348. The control system 1340 may also include mass data storage, memory and/or a WLAN interface (all not shown).

Figure 13C:
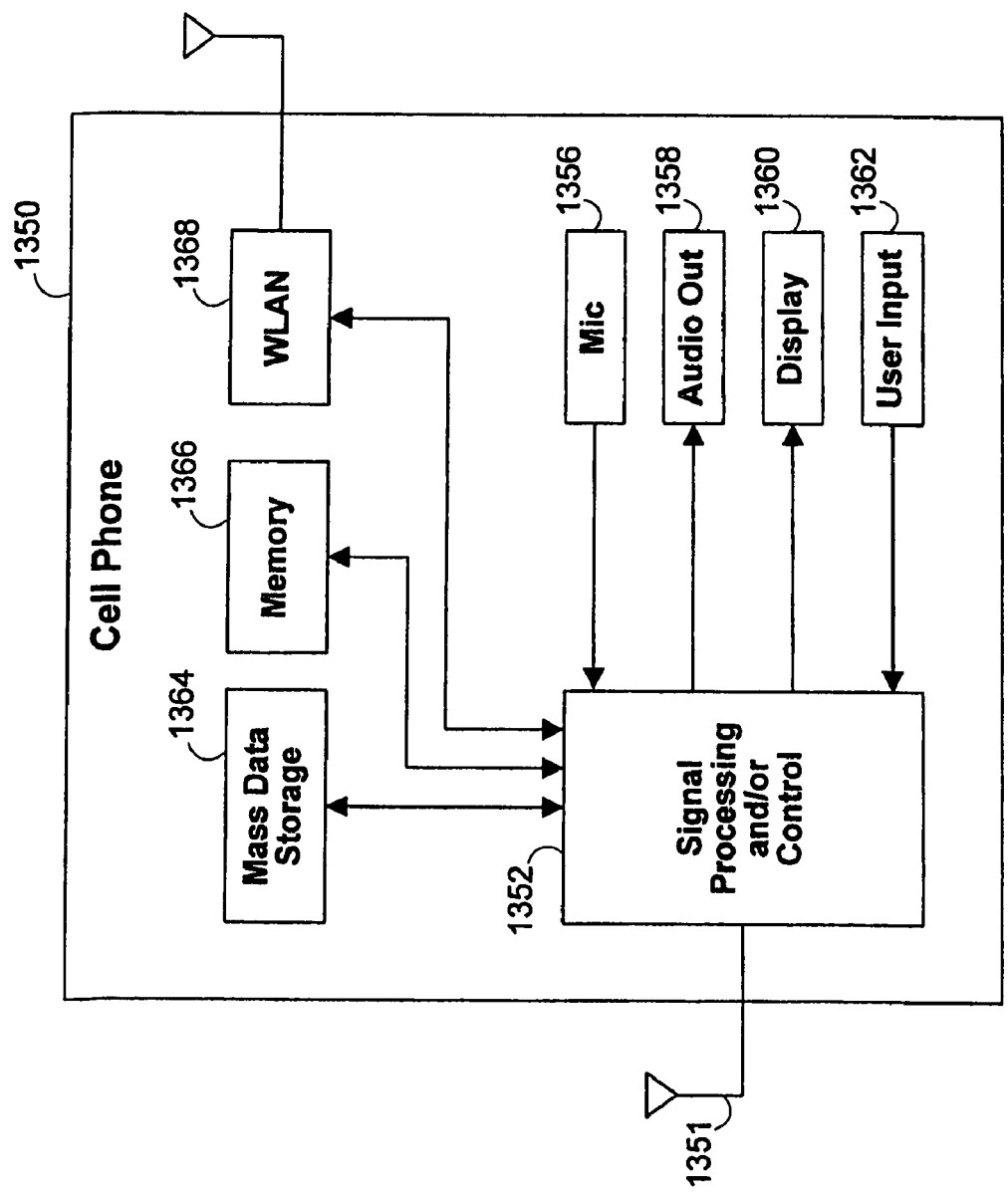
FIG. 13C is a block diagram of an exemplary cellular phone that can employ the disclosed technology.

Referring now to FIG. 13C, the present invention can be implemented in a cellular phone 1350 that may include a cellular antenna 1351. The present invention may implement either or both signal processing and/or control circuits, which are generally identified in FIG. 13C at 1352, a WLAN interface and/or mass data storage of the cellular phone 1350. In some implementations, the cellular phone 1350 includes a microphone 1356, an audio output 1358 such as a speaker and/or audio output jack, a display 1360 and/or an input device 1362 such as a keypad, pointing device, voice actuation and/or other input device. The signal processing and/or control circuits 1352 and/or other circuits (not shown) in the cellular phone 1350 may process data, perform coding and/or encryption, perform calculations, format data and/or perform other cellular phone functions.

The cellular phone 1350 may communicate with mass data storage 1364 that stores data in a nonvolatile manner such as optical and/or magnetic storage devices for example hard disk drives HDD and/or DVDs. The HDD may be a mini HDD that includes one or more platters having a diameter that is smaller than approximately 1.8". The cellular phone 1350 may be connected to memory 1366 such as RAM, ROM, low latency nonvolatile memory such as flash memory and/or other suitable electronic data storage. The cellular phone 1350 also may support connections with a WLAN via a WLAN network interface 1368.

Figure 13D:
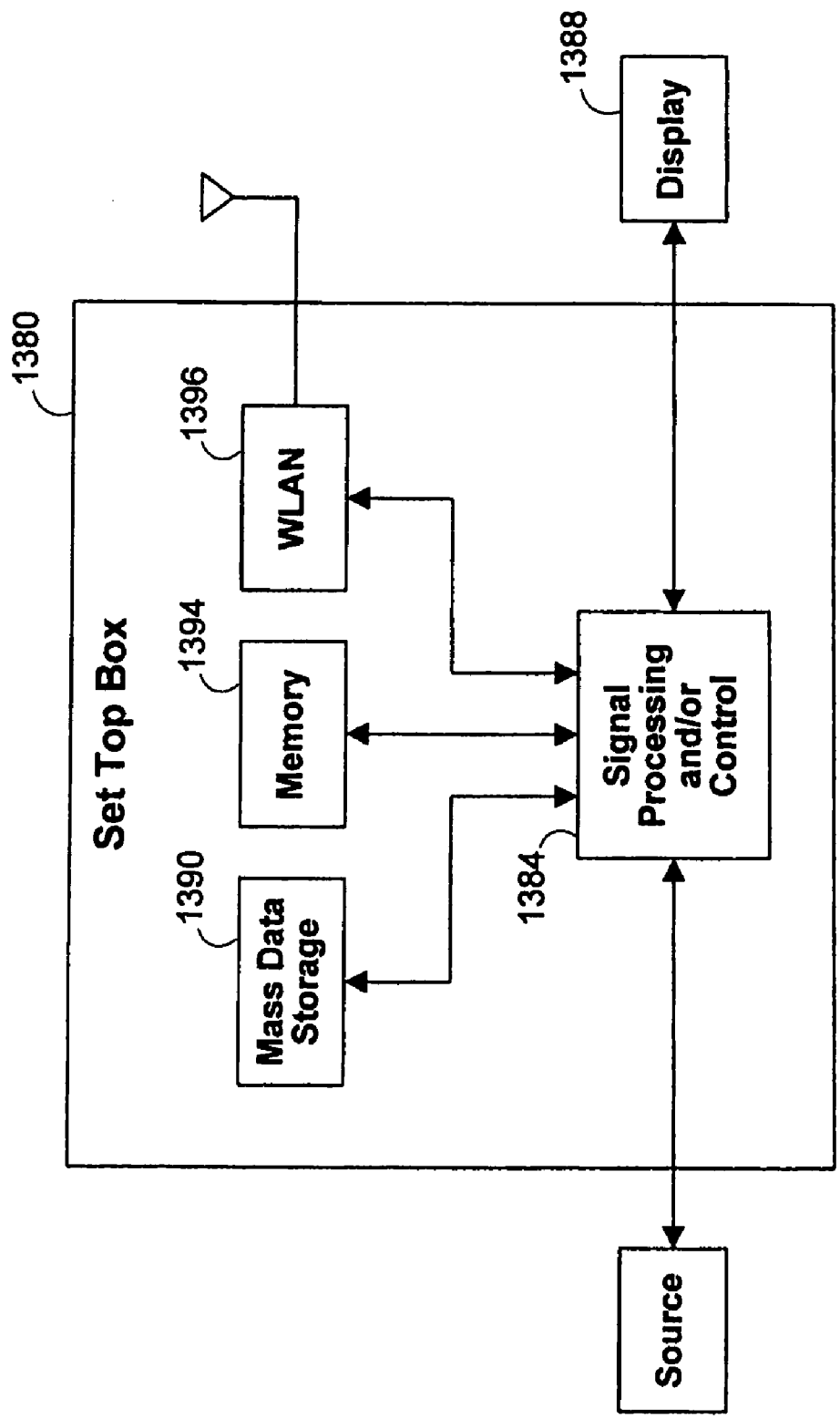
FIG. 13D is a block diagram of an exemplary set top box that can employ the disclosed technology.

Referring now to FIG. 13D, the present invention can be implemented in a set top box 1380. The present invention may implement either or both signal processing and/or control circuits, which are generally identified in FIG. 13D at 1384, a WLAN interface and/or mass data storage of the set top box 1380. The set top box 1380 receives signals from a source such as a broadband source and outputs standard and/or high definition audio/video signals suitable for a display 1388 such as a television and/or monitor and/or other video and/or audio output devices. The signal processing and/or control circuits 1384 and/or other circuits (not shown) of the set top box 1380 may process data, perform coding and/or encryption, perform calculations, format data and/or perform any other set top box function.

The set top box 1380 may communicate with mass data storage 1390 that stores data in a nonvolatile manner. The mass data storage 1390 may include optical and/or magnetic storage devices for example hard disk drives HDD and/or DVDs. The HDD may be a mini HDD that includes one or more platters having a diameter that is smaller than approximately 1.8". The set top box 1380 may be connected to memory 1394 such as RAM, ROM, low latency nonvolatile memory such as flash memory and/or other suitable electronic data storage. The set top box 1380 also may support connections with a WLAN via a WLAN network interface 1396.

Figure 13E:
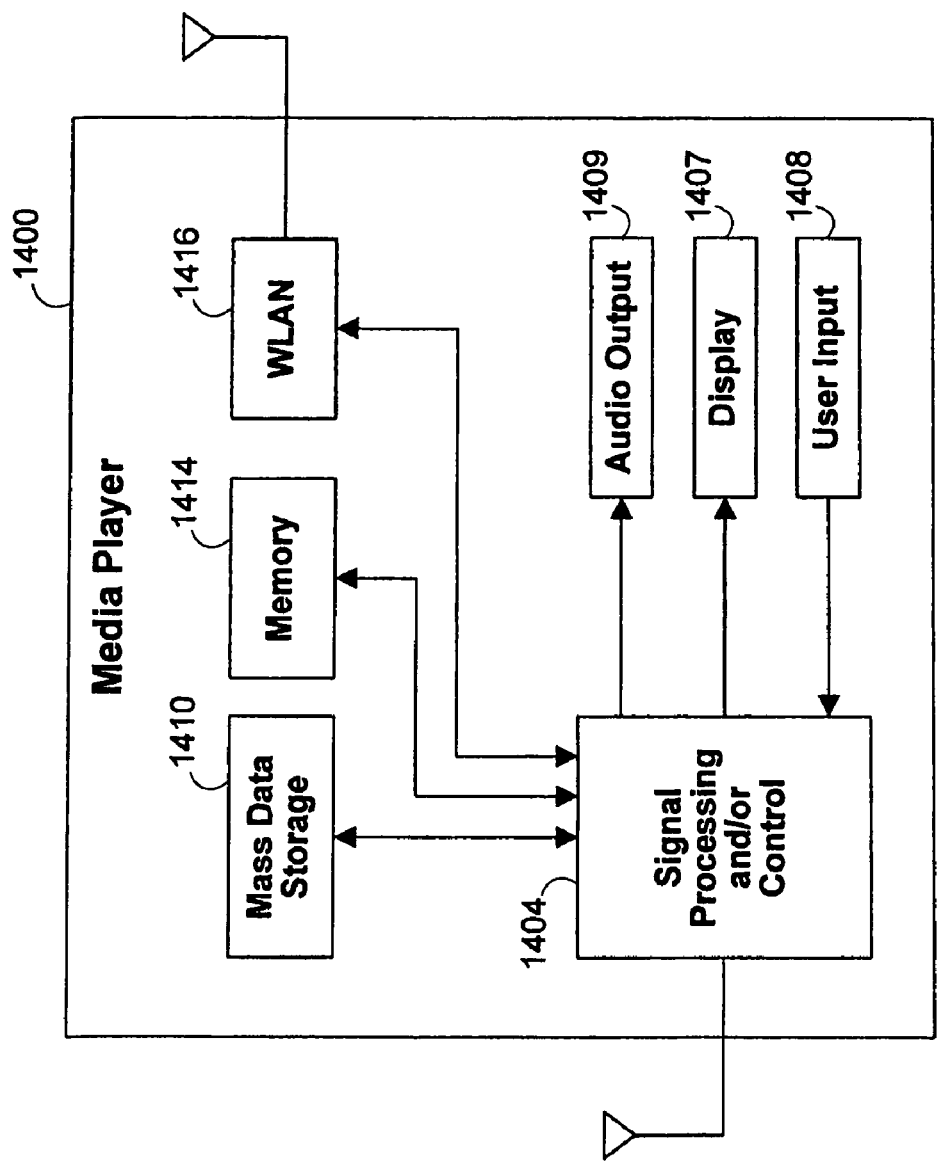
FIG. 13E is a block diagram of an exemplary media player that can employ the disclosed technology.

Referring now to FIG. 13E, the present invention can be implemented in a media player 1400. The present invention may implement either or both signal processing and/or control circuits, which are generally identified in FIG. 13E at 1404, a WLAN interface and/or mass data storage of the media player 1400. In some implementations, the media player 1400 includes a display 1407 and/or a user input 1408 such as a keypad, touchpad and the like. In some implementations, the media player 1400 may employ a graphical user interface (GUI) that typically employs menus, drop down menus, icons and/or a point-and-click interface via the display 1407 and/or user input 1408. The media player 1400 further includes an audio output 1409 such as a speaker and/or audio output jack. The signal processing and/or control circuits 1404 and/or other circuits (not shown) of the media player 1400 may process data, perform coding and/or encryption, perform calculations, format data and/or perform any other media player function.

The media player 1400 may communicate with mass data storage 1410 that stores data such as compressed audio and/or video content in a nonvolatile manner. In some implementations, the compressed audio files include files that are compliant with MP3 format or other suitable compressed audio and/or video formats. The mass data storage may include optical and/or magnetic storage devices for example hard disk drives HDD and/or DVDs. The HDD may be a mini HDD that includes one or more platters having a diameter that is smaller than approximately 1.8". The media player 1400 may be connected to memory 1414 such as RAM, ROM, low latency nonvolatile memory such as flash memory and/or other suitable electronic data storage. The media player 1400 also may support connections with a WLAN via a WLAN network interface 1416. Still other implementations in addition to those described above are contemplated.

Thus it is seen that methods and apparatus are provided for achieving efficient and reliable equalization of distortion caused by channels. One skilled in the art will appreciate that the invention can be practiced by embodiments other than those described, which are presented for the purposes of illustration and not of limitation, and the present invention is limited only by the claims which follow.

What is claimed is:

1. A method of receiving an input signal transmitted with one of a plurality of candidate quadrature amplitude modulation (QAM) constellations, said method comprising:
    performing, by blind equalization circuitry, a blind equalization algorithm on said input signal;
    performing, by constellation recovery circuitry, a constellation recovery algorithm on a signal responsive to said input signal to identify a constellation index corresponding to said one QAM constellation from a plurality of constellation indices corresponding to said plurality of candidate QAM constellations; and
    altering, by adaptation circuitry, said blind equalization algorithm based on said identified constellation index.

2. The method of claim 1 wherein said performing said constellation recovery occurs in response to substantial stabilization of at least one value of said blind equalization algorithm.

3. The method of claim 1 further comprising performing, by decision-directed equalization circuitry, a decision-directed equalization algorithm.

4. The method of claim 3 wherein said performing said decision-directed equalization algorithm occurs in response to said identifying said constellation index.

5. The method of claim 4 wherein:
said performing said blind equalization algorithm comprises filtering a signal responsive to said input signal using a plurality of filter values to generate a filter output signal; and
said performing said decision-directed equalization algorithm comprises modifying said plurality of filter values based at least in part on said identified constellation index.

6. The method of claim 5 wherein said performing said constellation recovery algorithm further comprises:
computing a scaling factor based on said constellation index; and
scaling a signal responsive to said filter output signal by said scaling factor to generate a scaled output signal.

7. The method of claim 6 wherein said performing said decision-directed equalization algorithm further comprises:
comparing a signal responsive to said scaled output signal to at least one voltage threshold to generate a decision output signal; and
computing an error signal based on said scaled output signal and said decision output signal, wherein said modifying said plurality of filter values is based at least in part on said computed error signal.

8. The method of claim 1 wherein said performing said blind equalization algorithm comprises:
filtering a signal responsive to said input signal using a plurality of filter values to generate a filter output signal;
computing a first error signal using a first error function, wherein said first error function uses a signal responsive to said filter output signal as an input; and
modifying said plurality of filter values using a signal responsive to said first error signal.

9. The method of claim 8 wherein said first error function remains substantially unchanged until said constellation index is identified.

10. The method of claim 8 wherein said computing said first error signal comprises computing at least one second-order statistic from said signal responsive to said filter output signal.

11. The method of claim 8 wherein said modifying said plurality of filter values comprises performing a minimum mean squared error algorithm based at least in part on said first error signal.

12. The method of claim 11 further comprising:
performing a decision-directed equalization algorithm, wherein said performing said decision-directed equalization algorithm comprises computing a second error signal based at least in part on said filter output signal; and
modifying said plurality of filter values using a signal responsive to said second error signal.

13. The method of claim 1 wherein said constellation recovery algorithm comprises:
selecting a candidate constellation; and
computing a mean squared error of a signal responsive to said input signal based on said selected candidate constellation.

14. The method of claim 13 wherein said constellation recovery algorithm further comprises:
comparing a measured occurrence rate of said signal responsive to said input signal at a selected point in said candidate constellation to an expected occurrence rate of said signal responsive to said input signal at said selected point, wherein:
said identifying said constellation index is based on said computing said mean squared error and said comparing said measured occurrence rate to said expected occurrence rate.

15. Circuitry for receiving an input signal transmitted with one of a plurality of candidate quadrature amplitude modulation (QAM) constellations, said circuitry comprising:
blind equalization circuitry operable to receive said input signal, wherein said blind equalization circuitry comprises adaptation circuitry operable to alter operation of said blind equalization circuitry based on a constellation index corresponding to said one QAM constellation; and
constellation recovery circuitry operable to receive a signal responsive to said input signal and to identify said constellation index from a plurality of constellation indices corresponding to said plurality of candidate QAM constellations.

16. The circuitry of claim 15 wherein said constellation recovery circuitry is operable to be activated in response to substantial stabilization of at least one value of said blind equalization circuitry.

17. The circuitry of claim 15 further comprising decision-directed equalization circuitry responsive to said blind equalization circuitry and said constellation recovery circuitry.

18. The circuitry of claim 17 wherein said decision-directed equalization circuitry is operable to be activated in response to said identifying said constellation index.

19. The circuitry of claim 18 wherein:
said blind equalization circuitry comprises filter circuitry operable to filter a signal responsive to said input signal using a plurality of filter values to generate a filter output signal; and
said decision-directed equalization circuitry is operable to modify said plurality of filter values based at least in part on said identified constellation index.

20. The circuitry of claim 19 wherein said constellation recovery circuitry comprises:
gain adjustment circuitry responsive to said constellation recovery circuitry, wherein said gain adjustment circuitry is operable to compute a scaling factor based on said constellation index; and
scaling circuitry responsive to said gain adjustment circuitry, wherein said scaling circuitry is operable to scale a signal responsive to said filter output signal by said scaling factor to generate a scaled output signal.

21. The circuitry of claim 20 wherein said decision-directed equalization circuitry further comprises:
decision device circuitry responsive to said constellation recovery circuitry and said scaling circuitry, wherein said decision device circuitry is operable to compare a signal responsive to said scaled output signal to at least one voltage threshold to generate a decision output signal; and
error computation circuitry responsive to said scaling circuitry and said decision device circuitry, wherein said error computation circuitry is operable to compute an error signal based on said scaled output signal and said decision output signal, wherein said modifying said plurality of filter values is based at least in part on said computed error signal.

22. The circuitry of claim 15 wherein said blind equalization circuitry comprises:

filter circuitry operable to filter a signal responsive to said input signal using a plurality of filter values to generate a filter output signal;

first error computation circuitry responsive to said filter circuitry, wherein:
   said first error computation circuitry is operable to compute a first error signal using a first error function, and
   said first error function uses a signal responsive to said filter output signal as an input; and adaptation circuitry operable to modify said plurality of filter values using a signal responsive to said first error signal.

23. The circuitry of claim 22 wherein said first error computation circuitry is operable to maintain said first error function substantially unchanged until said constellation index is identified.

24. The circuitry of claim 22 wherein said first error computation circuitry is operable to compute at least one second-order statistic from said signal responsive to said filter output signal.

25. The circuitry of claim 22 wherein said adaptation circuitry is operable to perform a minimum mean squared error algorithm based at least in part on said first error signal.

26. The circuitry of claim 25 further comprising decision-directed equalization circuitry responsive to said blind equalization circuitry and said constellation recovery circuitry, wherein:

said decision-directed equalization circuitry is operable to compute a second error signal based at least in part on said filter output signal; and said adaptation circuitry is further operable to modify said plurality of filter values using a signal responsive to said second error signal.

27. The circuitry of claim 15 wherein said constellation recovery circuitry is operable to:

select a candidate constellation; and compute a mean squared error of a signal responsive to said input signal based on said selected candidate constellation.

28. The circuitry of claim 27 wherein said constellation recovery circuitry is further operable to:

compare a measured occurrence rate of said signal responsive to said input signal at a selected point in said candidate constellation to an expected occurrence rate of said signal responsive to said input signal at said selected point, wherein:

said identifying said constellation index is based on said computing said mean squared error and said comparing said measured occurrence rate to said expected occurrence rate.

* * * * *